J. CLAYTON.
DEVICE FOR EFFECTING THE CONNECTION OF CIRCULAR ROTATABLE BODIES TO THEIR SHAFTS.
APPLICATION FILED APR. 18, 1916.
1,224,069.
Patented Apr. 24, 1917.
2 SHEETS—SHEET 1.
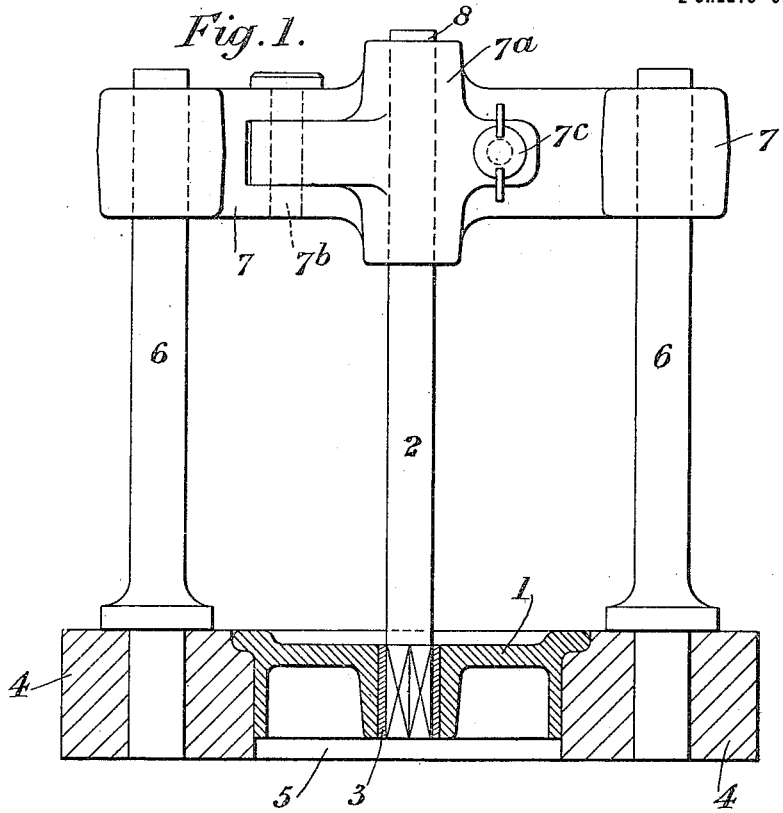
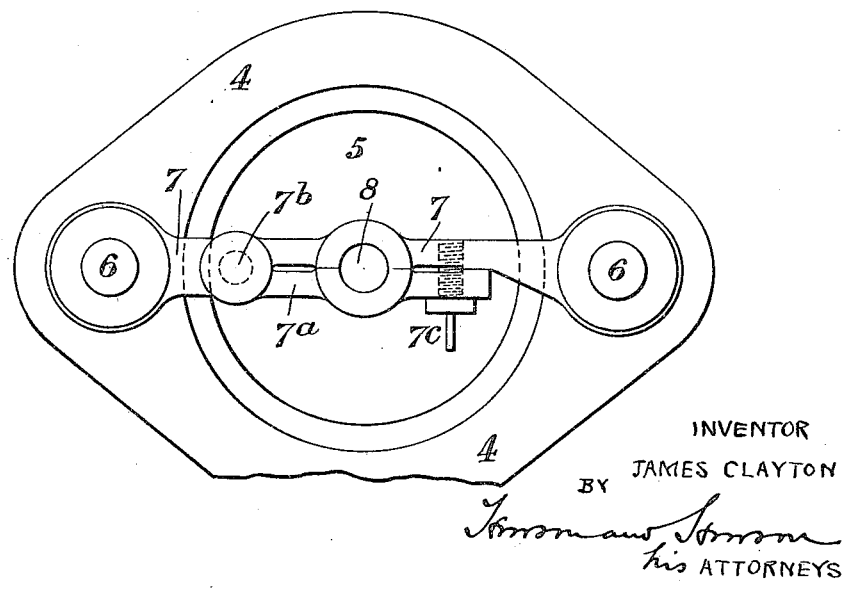
INVENTOR
JAMES CLAYTON
BY
his ATTORNEYS J. CLAYTON.
DEVICE FOR EFFECTING THE CONNECTION OF CIRCULAR ROTATABLE BODIES TO THEIR SHAFTS.
APPLICATION FILED APR. 18, 1916.

1,224,069.

Patented Apr. 24, 1917.
2 SHEETS—SHEET 2.

INVENTOR
JAMES CLAYTON
BY
ATTORNEYS

UNITED STATES PATENT OFFICE.

JAMES CLAYTON, OF COVENTRY, ENGLAND, ASSIGNOR TO COURTAULDS, LIMITED, OF LONDON, ENGLAND.

DEVICE FOR EFFECTING THE CONNECTION OF CIRCULAR ROTATABLE BODIES TO THEIR SHAFTS.

1,224,069.   Specification of Letters Patent.   Patented Apr. 24, 1917.

Application filed April 18, 1916. Serial No. 91,987.

*To all whom it may concern:*

Be it known that I, JAMES CLAYTON, a subject of the King of Great Britain, residing at 12 Middleborough road, Coventry, England, have invented new and useful Improvements in Devices for Effecting the Connection of Circular Rotatable Bodies to Their Shafts, of which the following is a specification.

This invention consists in an improved device for effecting the connection of circular rotatable bodies to shafts and is more especially intended for use in attaching, to their shafts, the rotatable glass roller-guides, or goddets, used in machinery for the manufacture of artificial silk for guiding the threads in their passage from the precipitating bath to the tubular guides of the spinning devices.

I will presume, for the purposes of description, that the device according to this invention is to be employed in effecting the attachment of a glass roller-guide, or goddet, to its shaft.

Figure 3:
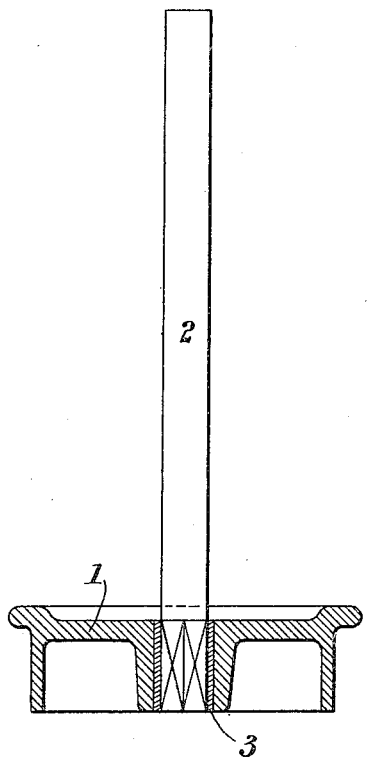
Figure 4:
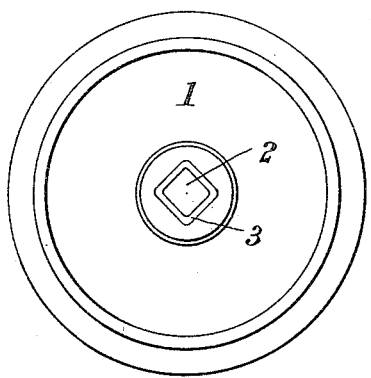

I will describe this invention with reference to the accompanying drawings, Figure 1 showing a roller-guide, or goddet, and its shaft in place in the improved device in which they have been connected. Fig. 2 is a plan of the said device, Fig. 3 is an elevation (with the roller-guide, or goddet, in section) and Fig. 4 is a plan of the connected roller-guide, or goddet, and shaft.

In a device in accordance with this invention the roller-guide, or goddet, 1, and its shaft 2 are supported in such a way that their axes are coincident, and in line, with each other, the central opening in the said roller-guide, or goddet, being sufficient to leave a space (at 3) between itself and the shaft. The end of the shaft 2 and the central opening in the roller-guide, or goddet 1, should be square or of equivalent, formation so that the space, at 3, around the said shaft and between it and the central opening in the roller-guide, or goddet, is also square, or equivalently formed. Into this space 3, there is introduced a material (indicated by the thick-black filling) which can, by heat, or otherwise, be brought into a condition which will allow of its introduction into the said space, and which material will, after its introduction, set into a sufficiently hard mass to form a solid connection between the roller-guide, or goddet, and shaft. Pitch is a suitable material for this purpose, but any other suitable material can be used. The device constituting this invention and by which the true relative positions of the roller-guide, or goddet, and the shaft are assured during the introduction of the pitch, or other material, is constructed as follows:

In a base piece or plate 4 is an opening 5, in which the roller-guide, or goddet 1, is placed, and fits. Supports 6 from this base piece or plate carry a cross-head 7, in which the shaft 2, can be received and held firmly so that the axes of the shaft 2, and of the roller-guide, or goddet 1, are in true axial line as shown in Fig. 1. The cross-head 7, may be formed with a strap piece 7ª, hinged at 7ᵇ, which hinged strap piece has in it one half of a recess 8, for the reception of the shaft 2, the other half of the recess 8 being formed in the cross-head 7. The said strap piece 7ª, is opened out for the reception of the shaft 2 and is secured to the cross-head 7, by a screw 7ᶜ, or otherwise, to hold the said shaft 2, in firm position, the axis of the recess 8 which receives and holds the shaft and the axis of the recess 5, in the base piece or plate 4 which has received the roller-guide, or goddet 1, being formed in true line with each other, the openings 5, and 8, being preferably bored at one operation to insure their true alinement with each other.

What I claim is:—

A device for use in connecting circular rotatable bodies to shafts, the said device consisting of a base-piece or plate, with an opening to receive the body and a cross-head supported from the said base-piece, or plate, and having in it one portion of an opening for receiving the shaft, a strap-piece connected with the cross-head having in it the other portion of the opening for receiving the shaft and means for securing the said strap-piece to the cross-head, the axes of the opening for the shaft and the opening for the body being in line with each other; substantially as hereinbefore explained.

In testimony whereof I have signed my name to this specification in the presence of two subscribing witnesses.

JAMES CLAYTON.

Witnesses:
  LEONARD WALTER,
  GILBERT FLETCHER TYRON.